(12) United States Patent
Byun et al.

(10) Patent No.: US 7,616,400 B2
(45) Date of Patent: Nov. 10, 2009

(54) HARD DISK DRIVE ASSEMBLY HAVING MOUNTING BRACKET AND MOBILE PHONE EMPLOYING THE SAME

(75) Inventors: Yong-kyu Byun, Yongin-si (KR); No-yeol Park, Seoul (KR); Min-pyo Hong, Suwon-si (KR); Sang-min Suh, Seoul (KR); Byoung-gyou Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 436 days.

(21) Appl. No.: 11/154,515

(22) Filed: Jun. 17, 2005

(65) Prior Publication Data

US 2006/0050431 A1 Mar. 9, 2006

(30) Foreign Application Priority Data

Sep. 9, 2004 (KR) ...................... 10-2004-0072091

(51) Int. Cl.
*G11B 13/04* (2006.01)
(52) U.S. Cl. .................................................. 360/97.01
(58) Field of Classification Search ............... 360/97.01
See application file for complete search history.

(56) References Cited

U.S. PATENT DOCUMENTS

| | | | | | |
|---|---|---|---|---|---|
| 4,639,863 | A | * | 1/1987 | Harrison et al. | 360/97.01 |
| 5,396,384 | A | * | 3/1995 | Caldeira et al. | 360/98.01 |
| 5,541,787 | A | * | 7/1996 | Jabbari et al. | 360/97.01 |
| 5,822,152 | A | * | 10/1998 | Seaver et al. | 360/99.08 |
| 6,680,813 | B2 | * | 1/2004 | Dague et al. | 360/97.01 |
| 6,697,217 | B1 | * | 2/2004 | Codilian | 360/97.01 |
| 6,970,322 | B2 | * | 11/2005 | Bernett | 360/97.01 |

FOREIGN PATENT DOCUMENTS

CN 1129490 8/1996

* cited by examiner

*Primary Examiner*—Mark Blouin
(74) *Attorney, Agent, or Firm*—Sughrue Mion, PLLC

(57) ABSTRACT

Provided are a hard disk drive (HDD) assembly and a mobile phone employing the HDD assembly. The HDD assembly includes: a HDD including a base member, a cover member, a spindle motor installed on the base member, at least one data storage disk mounted on the spindle motor, and an actuator pivotably installed on the base member and moving a read/write head to a predetermined position on the disk; a printed circuit board (PCB) disposed beside the HDD and operating the HDD; and a mounting bracket mounted on an electronic device while accommodating the HDD and the PCB, and including a first accommodating space adapted to accommodate the HDD and a second accommodating space disposed beside the first accommodating space and adapted to accommodate the PCB.

22 Claims, 13 Drawing Sheets

HARD DISK DRIVE ASSEMBLY HAVING MOUNTING BRACKET AND MOBILE PHONE EMPLOYING THE SAME

This application claims the priority of Korean Patent Application No. 10-2004-0072091, filed on Sep. 9, 2004, in the Korean Intellectual Property Office, the disclosure of which is incorporated herein in its entirety by reference.

BACKGROUND OF THE INVENTION

1. Field of the Invention

The present invention relates to a small hard disk drive (HDD) assembly, and more particularly, to a HDD assembly having a mounting bracket that is used to mount the HDD assembly on an electronic device, and a mobile phone employing the HDD assembly.

2. Description of the Related Art

Hard disk drives (HDDs), which are information storage devices, reproduce data stored in a disk or record data on the disk using a read/write head. In such HDDs, the read/write head functions by being moved to a desired position by an actuator while being lifted a predetermined height above a recording surface of the rotating disk.

Recently, as portable electronic devices, such as mobile phones, personal digital assistants (PDAs), camcorders, and MP3 players, are required to have a higher performance, HDDs capable of storing a greater amount of information are employed in the portable electronic devices. Portable electronic devices are required to be lighter, thinner, and smaller, as well as to have higher performance. Accordingly, small-sized HDDs using a disk with a very small diameter, for example, a diameter of 1 or 0.85 inches, are generally employed in those portable electronic devices.

FIG. 1 is an exploded perspective view of a conventional small HDD. FIG. 2 is a perspective view of the conventional small HDD shown in FIG. 1, which is overturned.

Referring to FIGS. 1 and 2, a HDD 10 includes a base member 11 and a cover member 12 coupled to the base member 11 using a plurality of screws 19. The base member 11 supports a spindle motor 30 for rotating a disk 20 and an actuator 40 for moving a read/write head 44 to a desired position on the disk 20.

The actuator 40 includes a swing arm 42, which is rotatably coupled to an actuator pivot 41 that is installed on the base member 11, and a suspension 43, which is installed on an end portion of the swing arm 42 and elastically biases the read/write head 44 toward a surface of the disk 20. The actuator 40 includes a voice coil motor (VCM) 50 for rotating the swing arm 42. The VCM 50 includes a VCM coil 51, which is coupled to the other end portion of the swing arm 42, and a magnet 52, which is installed on the base member 11 to face the VCM coil 51. The VCM 50 is controlled by a servo control system, and rotates the swing arm 42 in a direction according to Fleming's Left Hand Rule due to an interaction between current input the VCM coil 51 and a magnetic field formed by the magnet 52.

A printed circuit board (PCB) 60 is disposed under the base member 11. The PCB 60 supports semiconductor chips 62 for operating the actuator 40, the read/write head 44, and the spindle motor 30, and various circuit elements 64.

In the meantime, as shown in FIG. 2, a motor support portion 16, for supporting the spindle motor 30, and a pivot support portion 17, for supporting the actuator pivot 41, protrude a predetermined height from a bottom surface of the base member 11. Insertion holes 66 and 67 into which the motor support portion 16 and the pivot support portion 17 are respectively inserted are formed in the PCB 60.

In the conventional small HDD 10, since the many semiconductor chips 62 and circuit elements 64 are mounted on the PCB 60, the insertion holes 66 and 67 should be as small as possible in order to secure sufficient areas for the semiconductor chips 62 and circuit elements 64. Accordingly, the motor support portion 16 for supporting the spindle motor 30 should be as small in diameter as possible, and thus, the spindle motor 30 employed in the small HDD 10 is also limited in size.

For example, for a conventional 0.85-inch diameter HDD, a spindle motor having a diameter of φ17.6 mm is generally used for that reason. Such a small spindle motor has disadvantages of a relatively low rotational stiffness Kt of 1.05 to 1.2 and a relatively high power consumption of approximately 57 mW. Additionally, in this case, it is not easy to start the motor at a low temperature.

FIG. 3 is an exploded perspective view of the conventional small HDD shown in FIG. 1, which is mounted on a portable electronic device, for example, a mobile phone. FIG. 4 is a vertical sectional view of the conventional small HDD mounted on the mobile phone shown in FIG. 3.

Referring to FIG. 3, the small HDD 10 constructed as above may be mounted inside an electronic device, for example, a mobile phone 80. Specifically, the HDD 10 is mounted on a mobile phone main PCB 83 installed between a front cover 81 and a back cover 82 of the mobile phone 80. Here, damping pads 71 and 72 are interposed between the cover member 12 of the HDD 10 and the mobile phone main PCB 83 and between the PCB 60 of the HDD 10 and the back cover 82, respectively. The damping pads 71 and 72 prevent external shocks and vibrations applied to the mobile phone 80 from being transferred to the HDD 10.

Referring to FIG. 4, when the HDD 10 is mounted on the mobile phone 80, the total thickness of the mobile phone 80 is relatively high. For example, it is assumed that the 0.85-inch diameter HDD 10 is mounted on the mobile phone 80. As shown in FIG. 4, when the thickness of the 0.85-inch diameter HDD 10 including the PCB 60 is 3.3 mm and the thickness of each of the damping pads 71 and 72 is 0.5 mm, the sum of the thickness of the HDD 10 and the thicknesses of the damping pads 71 and 72 is approximately 4.3 mm. If the thickness of the back cover 82, that is, 0.8 mm, is added to the sum, the total thickness of the HDD 10, the damping pads 71 and 72, and the back cover 82 is 5.1 mm.

As described above, when small HDDs are mounted on portable electronic devices, such as mobile phones, the thickness of the portable electronic devices increases, which is not consistent with the recent trend toward lighter, thinner, and smaller portable electronic devices.

Accordingly, there are demands to minimize a thickness increment of electronic devices employing HDDs by improving mounting structures of the HDDs.

SUMMARY OF THE INVENTION

The present invention provides a hard disk drive assembly, which has a separated printed circuit board and a mounting bracket to minimize a thickness increment of an electronic device employing a hard disk drive and is easy to handle and mount on the electronic device.

The present invention also provides a mobile phone on which the hard disk drive assembly is mounted.

Consistent with an aspect of the present invention, there is provided a hard disk drive assembly comprising: a hard disk drive including a base member, a cover member, a spindle motor installed on the base member, at least one data storage disk mounted on the spindle motor, and an actuator pivotably installed on the base member and moving a read/write head to a predetermined position on the disk; a printed circuit board disposed beside the hard disk drive and operating the hard disk drive; and a mounting bracket mounted on an electronic device while accommodating the hard disk drive and the printed circuit board, and including a first accommodating space adapted to accommodate the hard disk drive and a second accommodating space disposed beside the first accommodating space and adapted to accommodate the printed circuit board.

The hard disk drive assembly may further comprise a first damping pad interposed between the base member of the hard disk drive and the mounting bracket, and a second damping pad attached to an outer surface of the cover member of the hard disk drive.

The first damping pad may contact a surface of the base member other than protrusions formed on the base member. The protrusions may comprise a motor support portion, which supports the spindle motor of the hard disk drive, and a pivot support portion, which supports an actuator pivot. A surface of the first damping pad contacting the surface of the base member may conform with the curved surface of the base member.

The mounting bracket may have a through-hole into which the protrusions formed on the base member are inserted. The hard disk drive assembly may further comprise a cover plate attached to the mounting bracket to cover the through-hole. The cover plate may be a metal sheet. The cover plate may be spaced a predetermined distance from the protrusions formed on the base member.

The second damping pad may have a substantially rectangular frame shape attached along edges of the cover member of the hard disk drive. The second damping pad may have a substantially rectangular plate shape attached to the overall surface of the cover member of the hard disk drive. The first damping pad and the second damping pad may be made of viscoelastic material.

The printed circuit board may be electrically connected to the hard disk drive by at least one flexible printed circuit.

A partition may be formed between the first accommodating space and the second accommodating space. The printed circuit board may be electrically connected to the hard disk drive by the at least one flexible printed circuit, and the partition has at least one groove through which the at least one flexible printed circuit, passes.

The printed circuit board may be fixed in the second accommodating space of the mounting bracket using a plurality of screws.

Consistent with another aspect of the present invention, there is provided a mobile phone comprising: a front cover; a main printed circuit board installed on a rear surface of the front cover; a back cover coupled to the front cover to cover the main printed circuit board; and a hard disk drive assembly mounted thereinside, wherein the hard disk drive assembly comprises: a hard disk drive including a base member, a cover member, a spindle motor installed on the base member, at least one data storage disk mounted on the spindle motor, and an actuator pivotably installed on the base member and moving a read/write head to a predetermined position on the disk; a printed circuit board disposed beside the hard disk drive and operating the hard disk drive; and a mounting bracket mounted on the main printed circuit board while accommodating the hard disk drive and the printed circuit board, and including a first accommodating space adapted to accommodate the hard disk drive and a second accommodating space disposed beside the first accommodating space and adapted to accommodate the printed circuit board.

The printed circuit board may support electrically connecting means that electrically connects the printed circuit board to the main printed circuit board of the mobile phone.

The electrically connecting means may be a flexible printed circuit. The main printed circuit board may support a connector to which the flexible printed circuit is connected.

The electrically connecting means may be a mating socket. The printed circuit board may be fixed in the second accommodating space of the mounting bracket using a plurality of screws, and dampers may be installed between the printed circuit board and the mounting bracket.

The back cover may have an insertion hole into which the hard disk drive assembly is inserted.

The mounting bracket may be fixed to a predetermined position on the main printed circuit board using a plurality of mounting screws.

A screw insertion hole into which each of the plurality of mounting screws is inserted may be formed at each angular point of the mounting bracket.

A thin plate-shaped connecting unit may extend a predetermined length from each angular point of the mounting bracket to function as a spring, and a mounting unit having a screw insertion hole into which the mounting screw is inserted may be formed on an end portion of the connecting unit.

The plurality of mounting screws may be inserted into a plurality of screw coupling holes formed in the rear surface of the front cover.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
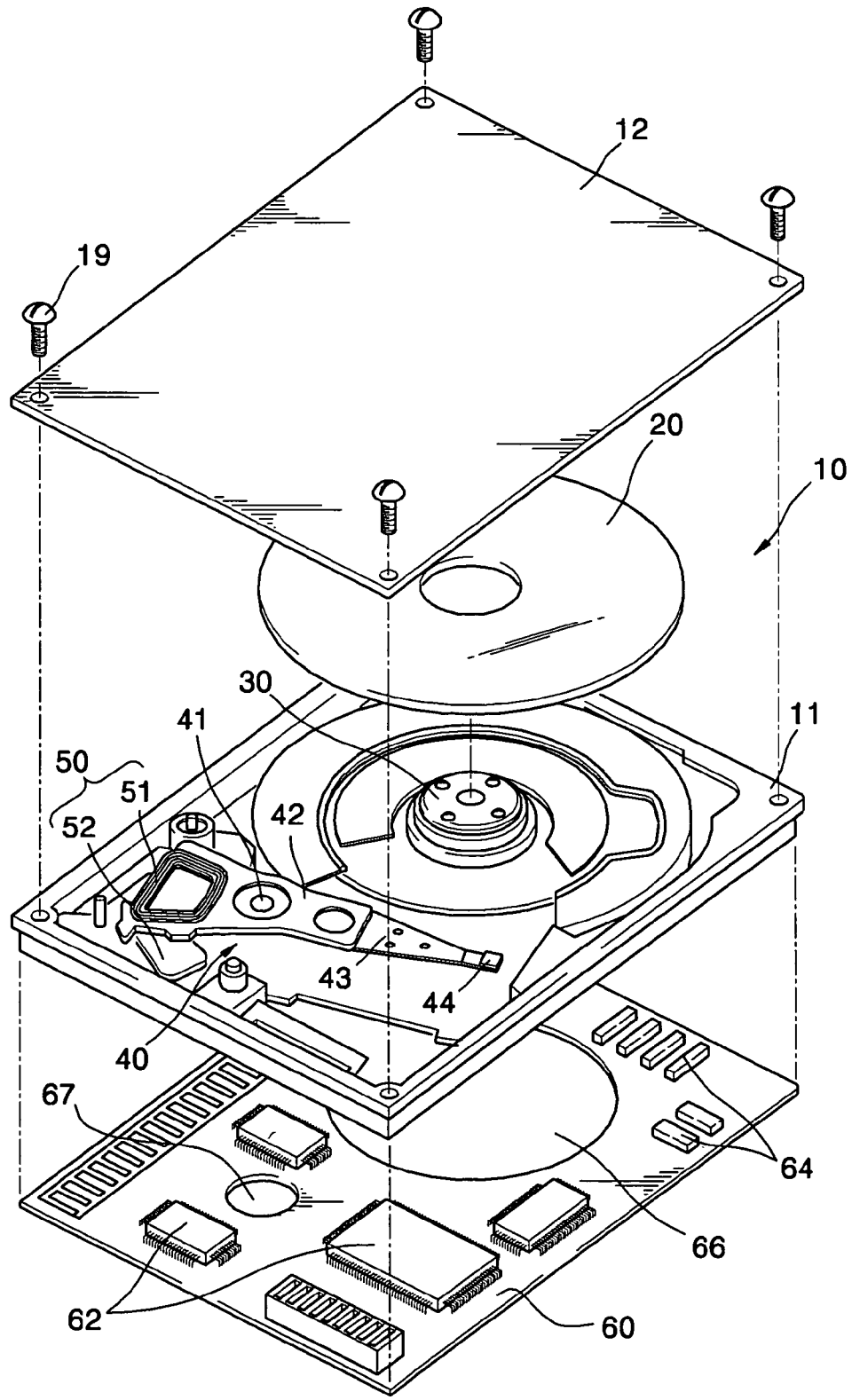
FIG. 1 is an exploded perspective view of a conventional small hard disk drive (HDD)
Figure 2:
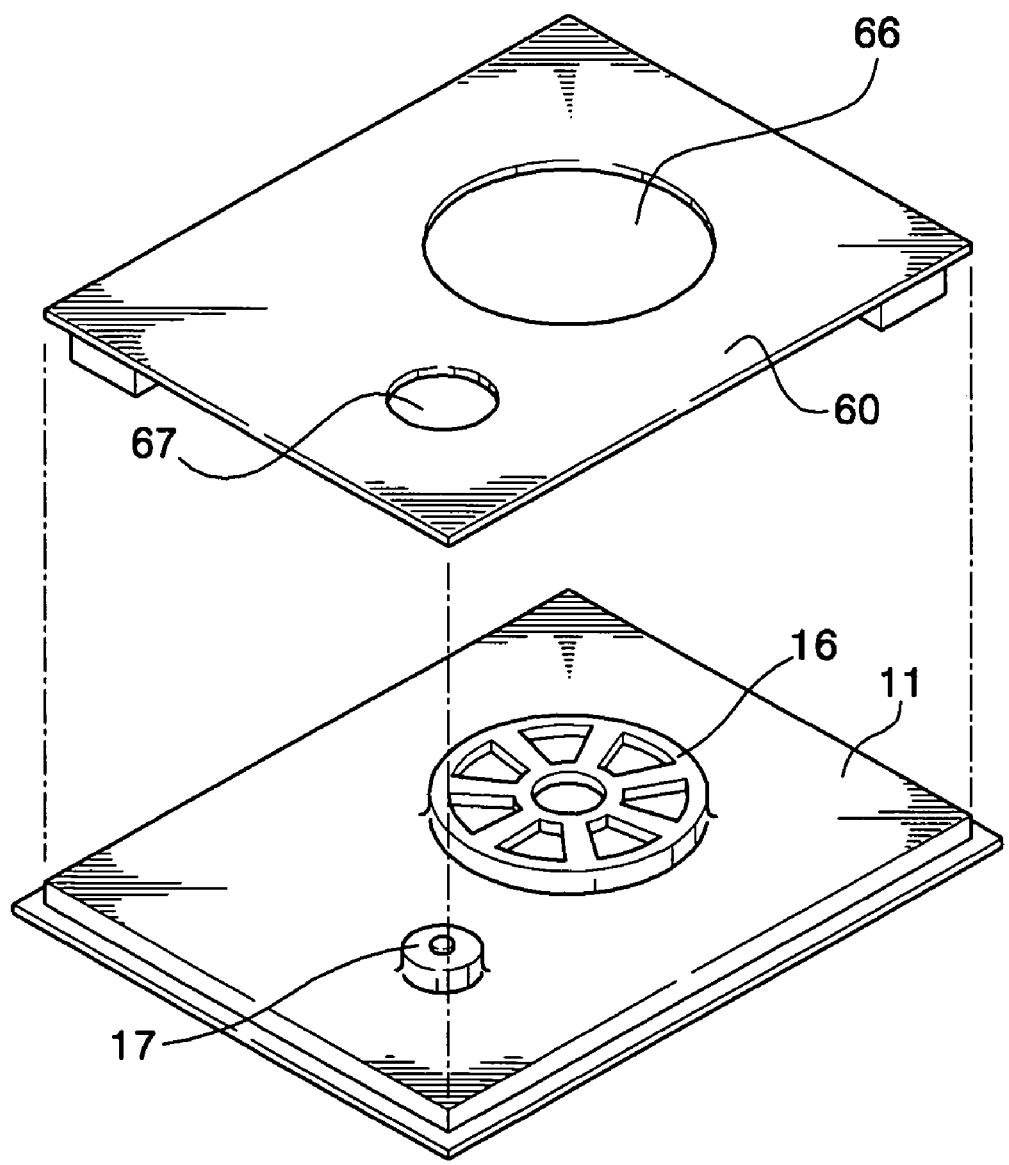
FIG. 2 is a perspective view of the conventional small HDD shown in FIG. 1, which is overturned.
Figure 3:
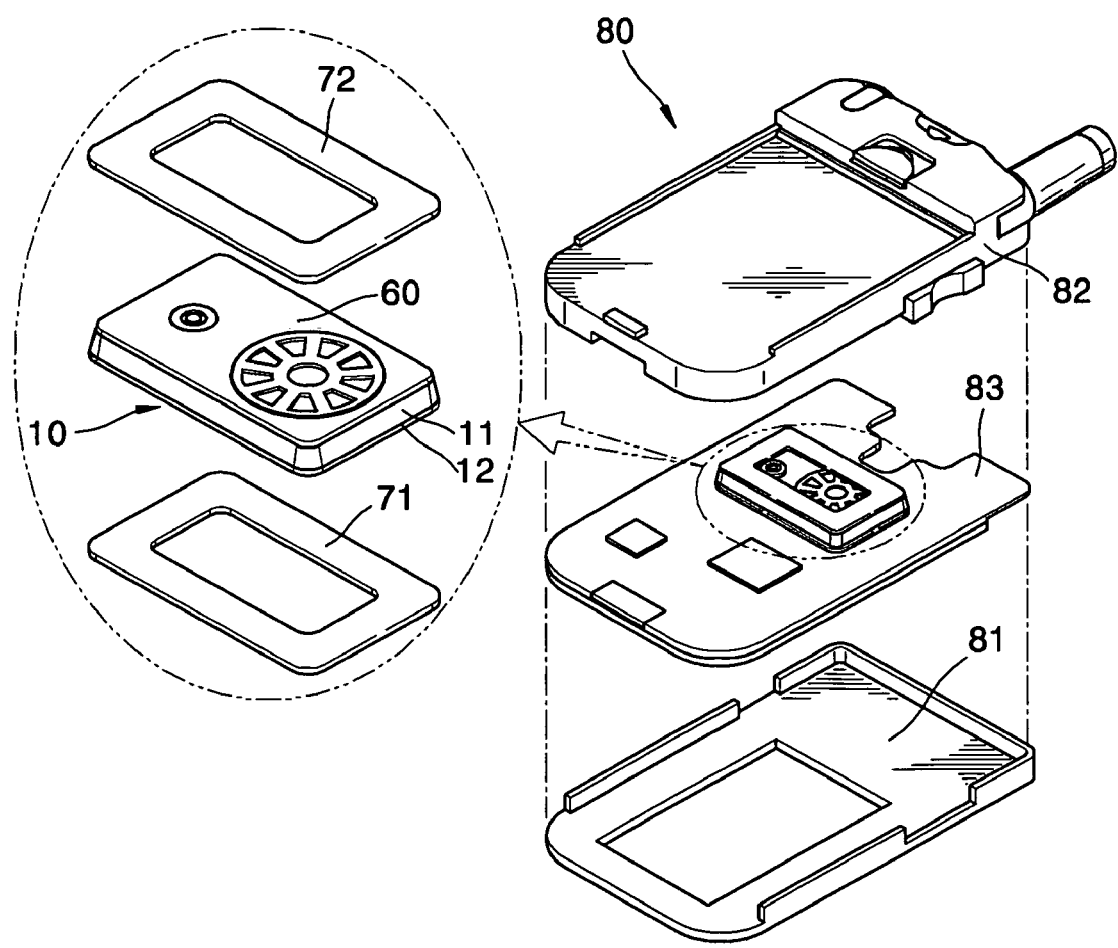
FIG. 3 is an exploded perspective view of the conventional small HDD shown in FIG. 1, which is mounted on a portable electronic device, for example, a mobile phone.
Figure 4:
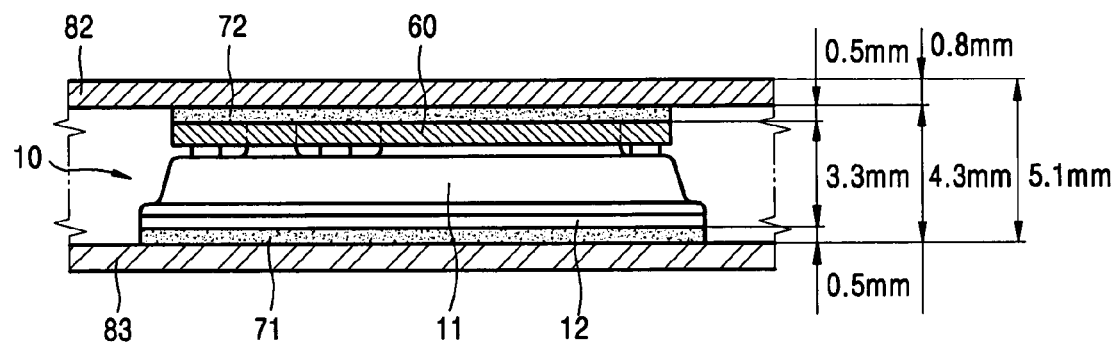
FIG. 4 is a vertical sectional view of the conventional small HDD mounted on the mobile phone shown in FIG. 3.

The present invention will now be described more fully with reference to the accompanying drawings, in which exemplary embodiments of the invention are shown. The same elements are given the same reference numerals throughout the drawings.

Figure 5:
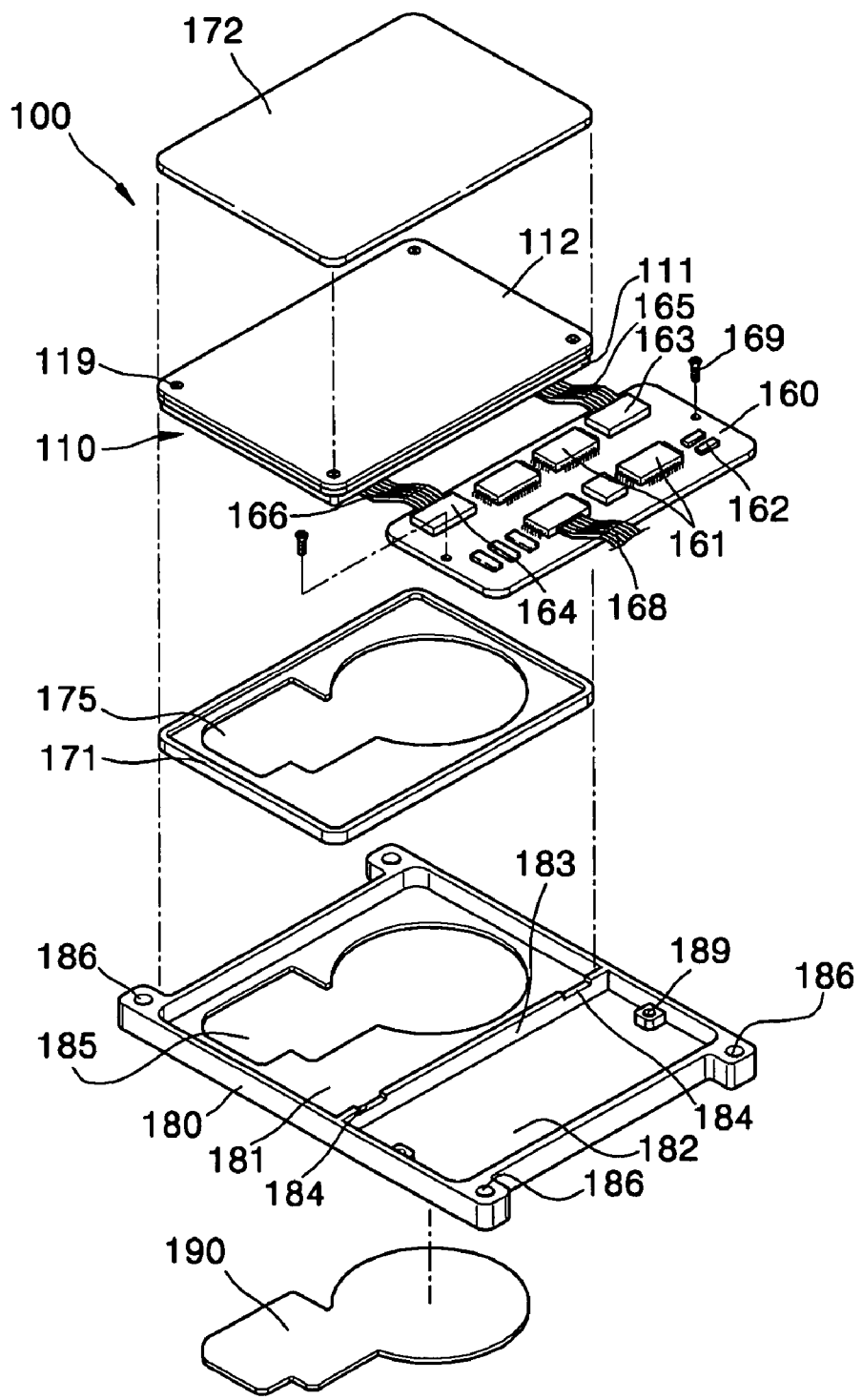
FIG. 5 is an exploded perspective view of a small HDD assembly having a mounting bracket consistent with an exemplary embodiment of the present invention.
Figure 6:
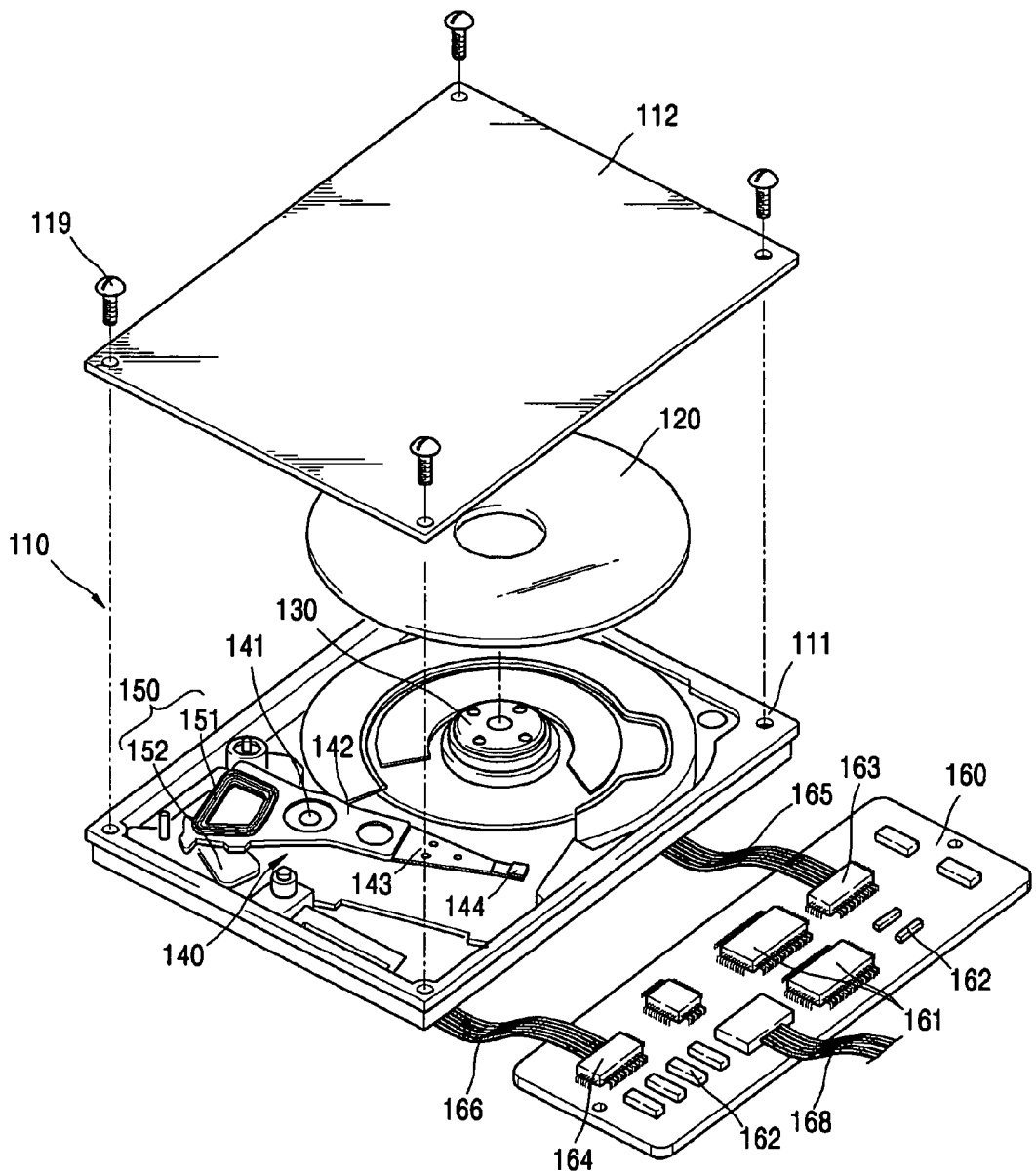
FIG. 6 is an exploded perspective view of a HDD of the HDD assembly shown in FIG. 5.
Figure 7:
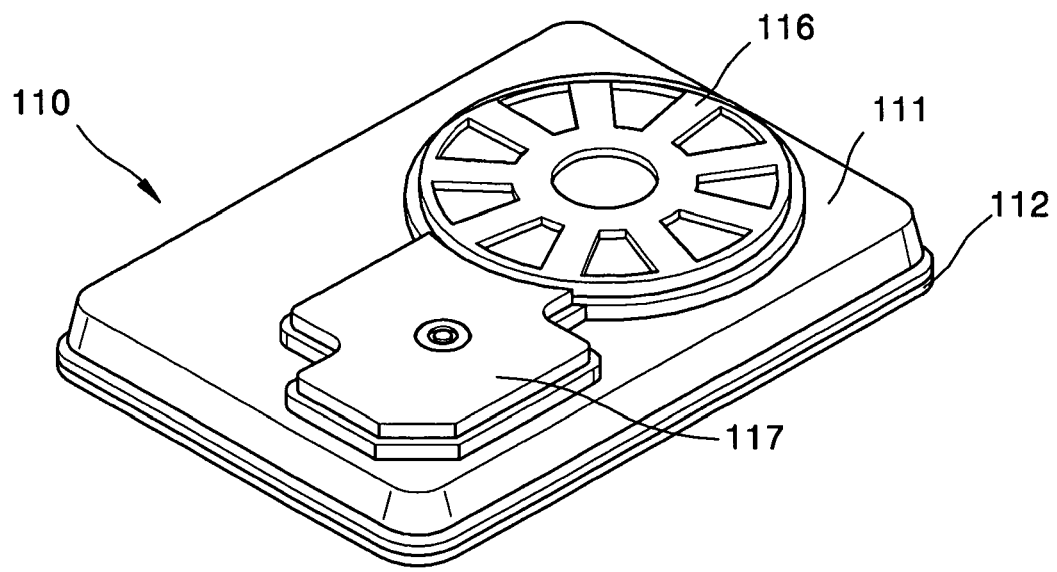
FIG. 7 is a perspective view of the HDD shown in FIG. 6, which is overturned.

FIG. 5 is an exploded perspective view of a small hard disk drive (HDD) assembly having a mounting bracket consistent with an exemplary embodiment of the present invention. FIG. 6 is an exploded perspective view of a HDD of the HDD assembly shown in FIG. 5. FIG. 7 is a perspective view of the HDD shown in FIG. 6, which is overturned.

Referring to FIGS. 5 through 7, a small HDD assembly 100 includes a HDD, which is an information storage device, a printed circuit board (PCB) 160, which operates the HDD 110, and a mounting bracket 180, which is used to mount the HDD 110 and the PCB 160 inside a portable electronic device, such as a mobile phone.

The HDD 110 includes a base member 111, and a cover member 112 coupled to the base member 111. The cover member 112 may be coupled to the base member 111 using a plurality of cover coupling screws 119. A spindle motor 130 is installed on the base member 111, and at least one data storage disk 120 is mounted on the spindle motor 130. An actuator 140 is installed on the base member 111 to move a read/write head 144 to a desired position on the disk 120.

The actuator 140 includes a swing arm 142 rotatably coupled to an actuator pivot 141 that is installed on the base member 111, and a suspension 143 installed on one end portion of the swing arm 142 and elastically biases the read/write head 144 toward a surface of the disk 120. A voice coil motor (VCM) 150 is provided on the actuator 140 to rotate the swing arm 142. The VCM 150 includes a VCM coil 151 coupled to the other end portion of the swing arm 142, and a magnet 152 facing the VCM coil 151. The VCM 150 is controlled by a servo control system, and rotates the swing arm 142 in a direction according to Fleming's Left Hand Rule due to an interaction between current input to the VCM coil 151 and a magnetic field formed by the magnet 152. That is, if the HDD 110 is turned on and the disk 120 begins to rotate, the VCM 150 rotates the swing arm 142 counterclockwise to move the read/write head 144 above a recording surface of the disk 120. In contrast, if the HDD 110 is turned off and the disk 120 stops rotating, the VCM 150 rotates the swing arm 142 clockwise to remove the read/write head 144 from the disk 120.

The PCB 160 operates the spindle motor 130 and the actuator 140 of the HDD 110, and supports thereon a plurality of semiconductor chips 161 and various kinds of circuit elements 162.

In the HDD assembly 100, the PCB 160 is disposed beside the HDD 110, and not under the base member 111.

The PCB 160 is electrically connected to the HDD 110. To this end, two flexible printed circuits (FPCs) 165 and 166 may be used. Specifically, one ends of the two FPCs 165 and 166 are respectively connected to the spindle motor 130 and the actuator 140 of the HDD 110. The other ends of the two FPCs 165 and 166 are respectively connected to two FPC connectors 163 and 164 provided on the PCB 160.

The HDD 110 and the PCB 160 constructed as above can be mounted on a portable electronic device, such as a mobile phone, a personal digital assistant (PDAs), a camcorder, and an MP3 player. In this case, connecting means for electrically connecting the electronic device to the PCB 160 is required. Various well-known means can be used as the electrically connecting means. For example, the PCB 160 may be electrically connected to the electronic device using another FPC 168.

The HDD assembly 100 consistent with an exemplary embodiment of the present invention has a mounting bracket 180 such that the HDD 110 and the PCB 160 can be easily handled and mounted on the electronic device.

The mounting bracket 180 includes a first accommodating space 181, adapted to accommodate the HDD 110, and a second accommodating space 182, disposed in parallel beside the first accommodating space 181 and adapted to accommodate the PCB 160. A partition 183 may be formed between the first accommodating space 181 and the second accommodating space 182. The partition 183 may have two grooves 184 through which the FPCs 165 and 166, for electrically connecting the HDD 110 and the PCB 160, pass.

As described above, the HDD 110 is accommodated in the first accommodating space 181 of the mounting bracket 180. Here, a first damping pad 171 is interposed between the mounting bracket 180 and the HDD 110. A second damping pad 172 may be attached to an outer surface of the HDD 110 accommodated in the first accommodating space 181.

In detail, the first damping pad 171 may be disposed between a bottom surface of the first accommodating space 181 and a surface of the base member 111 of the HDD 110. The first damping pad 171 absorbs and reduces external shocks or vibrations transferred to the HDD 110 through the mounting bracket 180. To this end, the first damping pad 171 may be made of viscoelastic material with a high vibration absorbency, for example, rubber or engineering plastic with a predetermined elasticity.

In the meantime, as shown in FIG. 7, protrusions, such as a motor support portion 116, which supports the spindle motor 130, and a pivot support portion 117, which supports the actuator pivot 141, protrude a predetermined height from the base member 111 of the HDD 110.

In an exemplary embodiment, the first damping pad 171 be attached to a surface of the base member 111 other than the protrusions, namely, the motor support portion 116 and the pivot support portion 117 formed on the base member 111. To this end, a through-hole 175, corresponding in shape to the motor support portion 116 and the pivot support portion 117, is formed in the first damping pad 171 such that the motor support portion 116 and the pivot support portion 117 pass through the through-hole 175. In this construction, a thickness increment of the HDD assembly 100 due to the first damping pad 171 does not occur. Further, in an exemplary embodiment, a surface of the first damping pad 171 contacting the surface of the base member 111, conforms with the curved surface of the base member 111. In this instance, since a contact area between the first damping pad 171 and the base member 111 increases, the shock-absorbency of the first damping pad 171 increases.

In an exemplary embodiment, a through-hole 185 can also be formed in the mounting bracket 180 such that the motor support portion 116 and the pivot support portion 117 of the base member 111 are inserted into the through-hole 185. In this construction, the total thickness of the HDD assembly 100 can be reduced further, which will be explained later.

As described previously, when the through-hole 185 is formed in the mounting bracket 180, a cover plate 190 may be attached to the mounting bracket 180 to cover the through-hole 185. The cover plate 190 prevents foreign substances, such as dust, from intruding into the HDD assembly 100, and also protects the HDD 110. In an exemplary embodiment, the cover plate 190 is as thin as possible, but maintains a stiffness high enough to resist warpage. To this end, a metal sheet having a thickness of approximately 0.2 mm, for example, a stainless steel plate or an aluminum plate, can be used as the cover plate 190.

In an exemplary embodiment, the cover plate 190 is spaced a predetermined distance from the protrusions, that is, the motor support portion 116 and the pivot support portion 117, protruding from the base member 111. Consequently, when the HDD 110 vibrates due to external shocks, the protrusions 116 and 117 can be prevented from colliding with the cover plate 190, which will be explained later.

The second damping pad 172 may be attached to a surface of the cover member 112 of the HDD 110 accommodated in the first accommodating space 181. The second damping pad 172 absorbs and reduces external shocks or vibrations transferred to the HDD 110. To this end, the second damping pad 172 may also be made of viscoelastic material having a high shock or vibration absorbency, for example, rubber or engineering plastic with a predetermined elasticity. The second damping pad 172 may have a substantially rectangular plate shape attached to the overall surface of the cover member 112 of the HDD 110.

Figure 9:
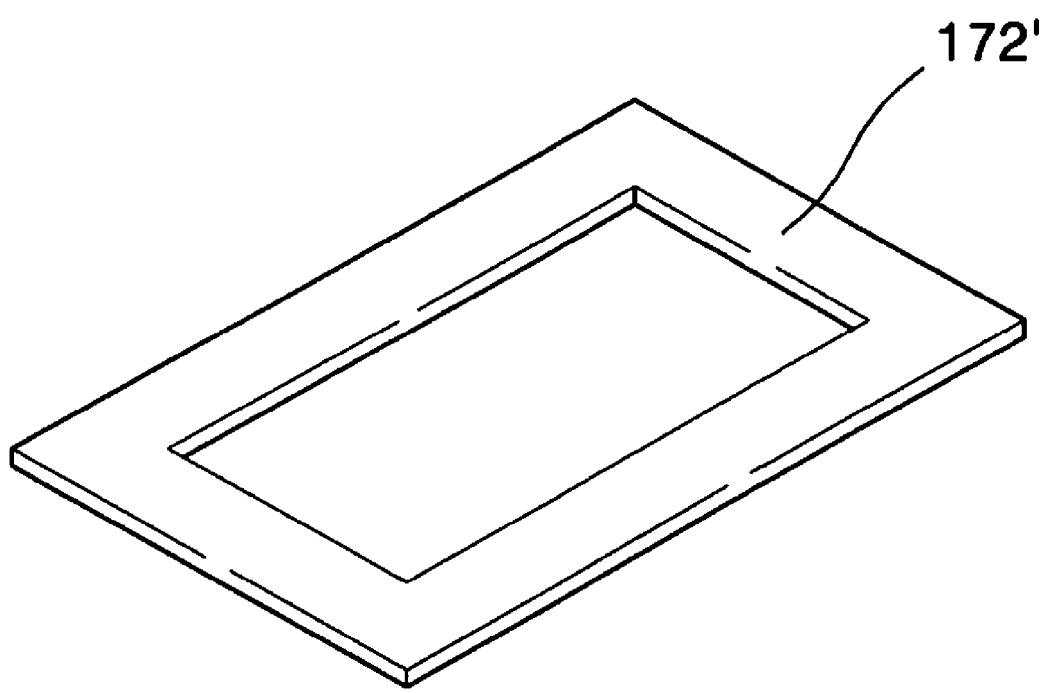
FIG. 9 is a perspective view illustrating a modified example of a first damping pad of the HDD assembly shown in FIG. 5.

Meanwhile, the second damping pad 172 may have various shapes other than the rectangular plate shape. For example, referring to FIG. 9, a second damping pad 172' attached to the surface of the cover member 112 of the HDD 110 may have a substantially rectangular frame shape contacting edges of the cover member 112.

The PCB 160 is accommodated in the second accommodating space 182 disposed beside the first accommodating space 181. Accordingly, in the HDD assembly 100, the HDD 110 and the PCB 160 are disposed on the same plane. Specifically, the PCB 160 may be fixed in the second accommodating space 182 using board coupling screws 169. To this end, screw coupling holes 189 into which the board coupling screws 169 are inserted are formed in the second accommodating space 182.

The mounting bracket 180 may be manufactured by steel sheet pressing or plastic injection molding. Screw insertion holes 186 are formed at four angular points of the mounting bracket 180 such that the mounting bracket 180 can be mounted on the electronic device, for example, the mobile phone, which will be explained later.

As described above, the HDD assembly 100 includes the mounting bracket 180 in which the HDD 110 and the PCB 160 are coupled to each other. Accordingly, since the elements of the HDD assembly 100 can be integrally handled, the HDD assembly 100 can be easily mounted on the portable electronic device, for example, a mobile phone. Also, a thickness increment of the electronic device, such as the mobile phone, due to the HDD assembly 100 mounted thereon can be minimized, which will be explained later in detail.

Since the PCB 160 is disposed beside the HDD 110, not under the base member 111, the motor support portion 116 is not limited in diameter by the semiconductor chips 161 and the circuit elements 162 mounted on the PCB 160. Therefore, the motor support portion 116 in the small HDD 110 is permitted to have a higher diameter than a conventional one.

Figure 8:
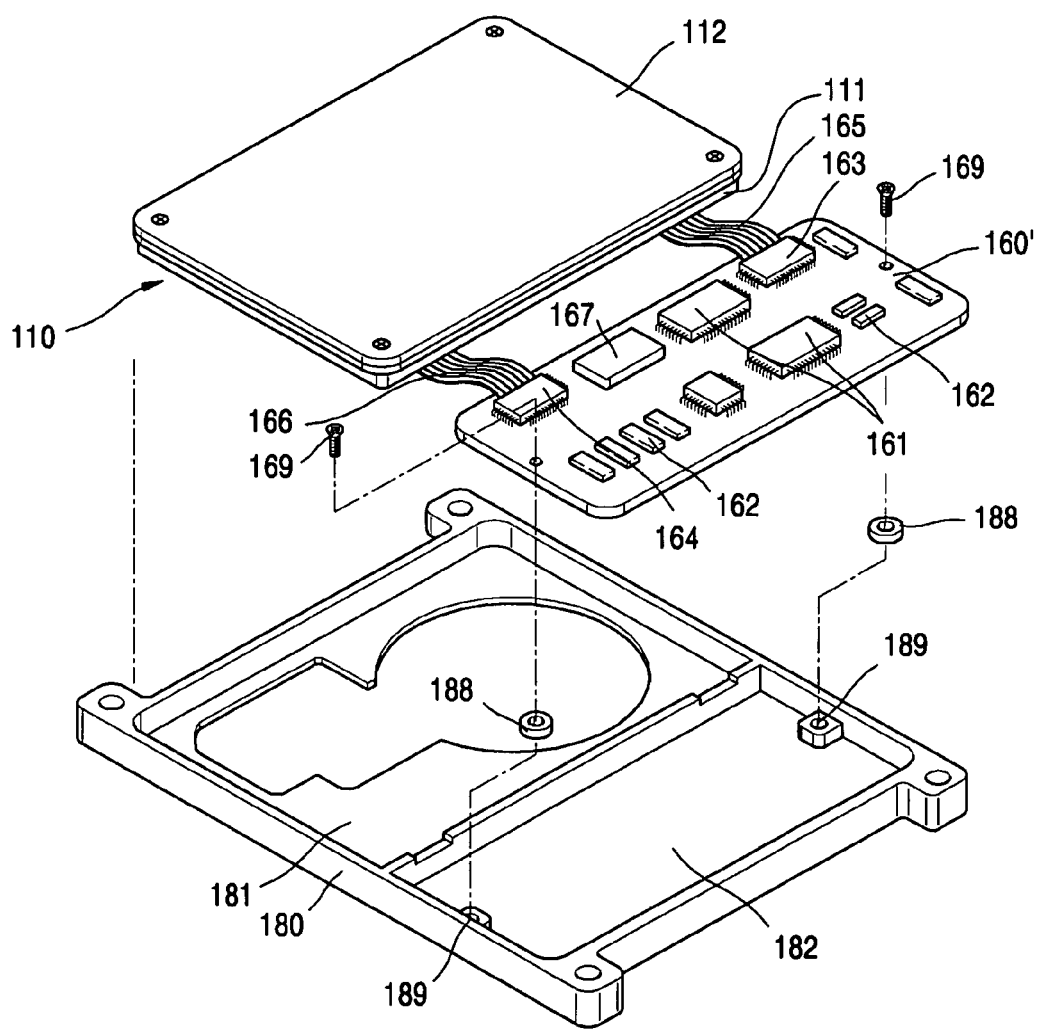
FIG. 8 is a perspective view illustrating a modified example of a printed circuit board (PCB) of the HDD assembly shown in FIG. 5.

FIG. 8 is a perspective view illustrating a modified example of the PCB of the HDD assembly shown in FIG. 5.

Figure 10:
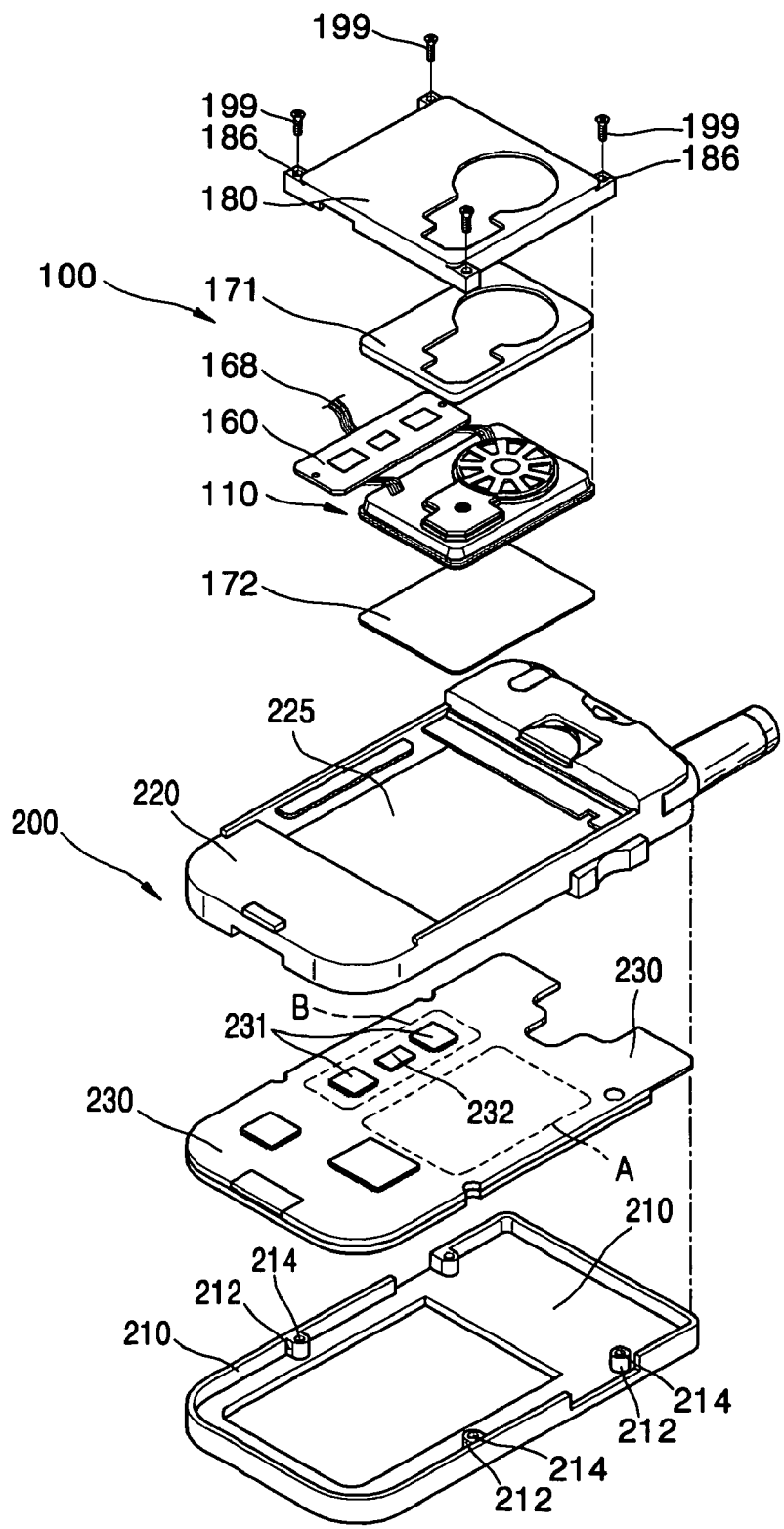
FIG. 10 is a schematic exploded perspective view of the mobile phone on which the HDD assembly shown in FIG. 5 is mounted.

Referring to FIG. 8, instead of the FPC 168, a mating socket 167 may be used as electrically connecting means for electrically connecting a PCB 160' and a main PCB 230 of a mobile phone 200 shown in FIG. 10.

Since the mating socket 167 does not have the flexibility of the FPC 168, the mating socket 167 is fixed to a predetermined position. Accordingly, if the mounting bracket 180 vibrates due to shocks, the mating socket 167 may be damaged or poor electrical connection may be made. To prevent such problems, dampers 188 may be installed between the PCB 160' and the mounting bracket 180. To be specific, the dampers 188 are disposed between the PCB 160' and the mounting bracket 180 while being fitted around the board coupling screws 169, which is used for fixing the PCB 160' to the mounting bracket 180 to absorb and to reduce shocks or vibrations transferred from the mounting bracket 180 to the PCB 160'.

Figure 11:
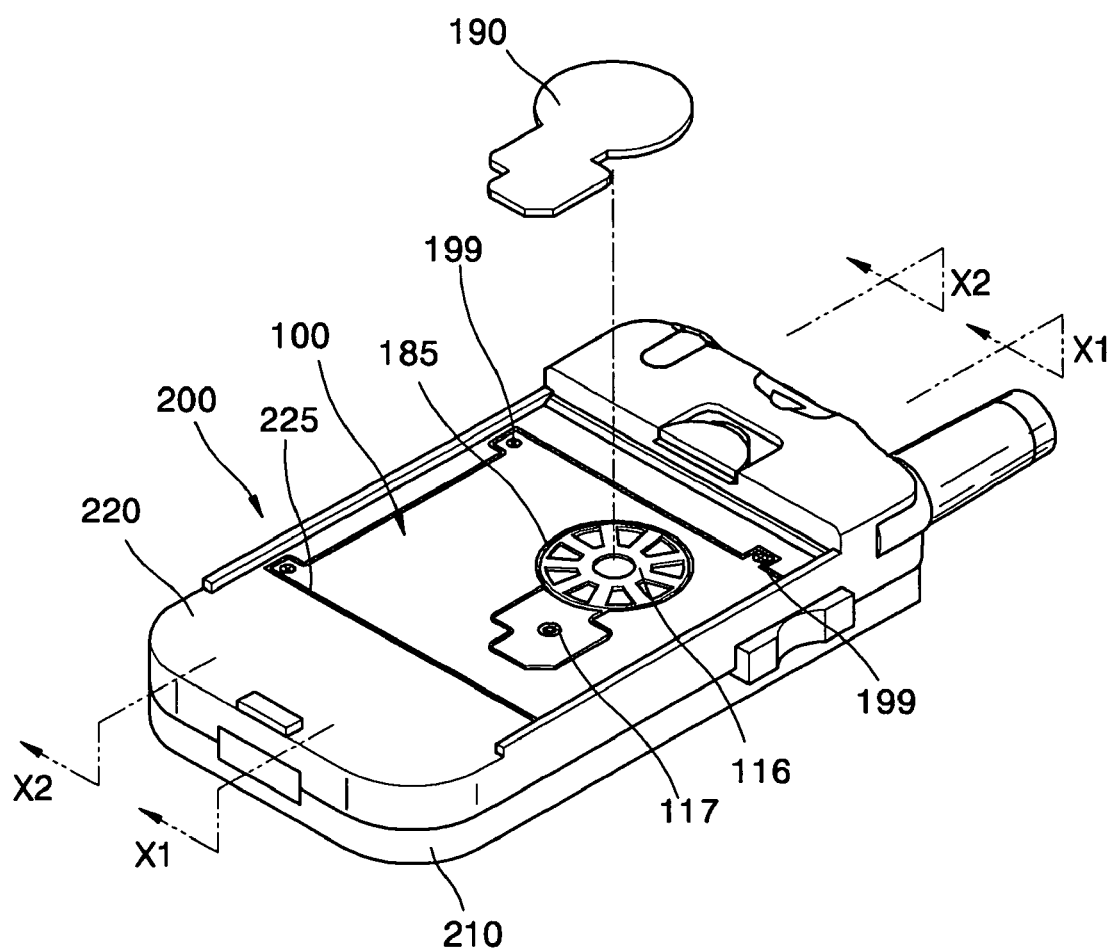
FIG. 11 is a perspective view of the mobile phone on which the HDD assembly is mounted shown in FIG. 5.
Figure 12:
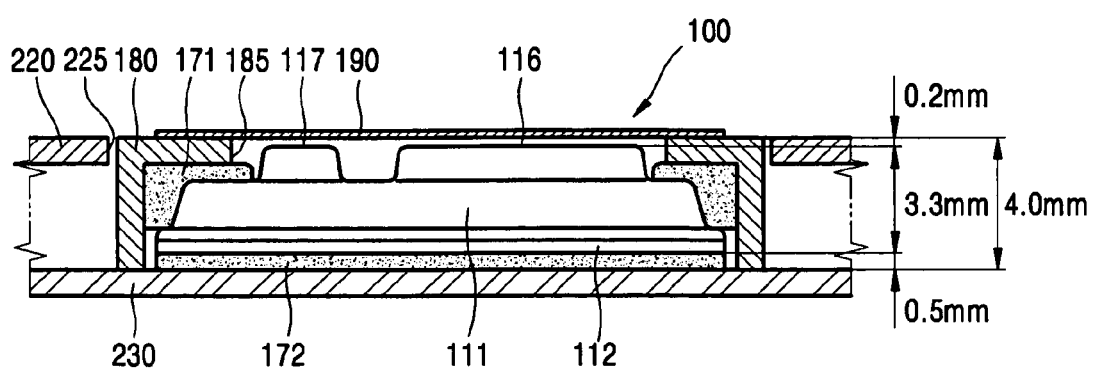
FIG. 12 is a sectional view of the mobile phone on which the HDD assembly is mounted, taken along line X1-X1 shown in FIG. 11.
Figure 13:
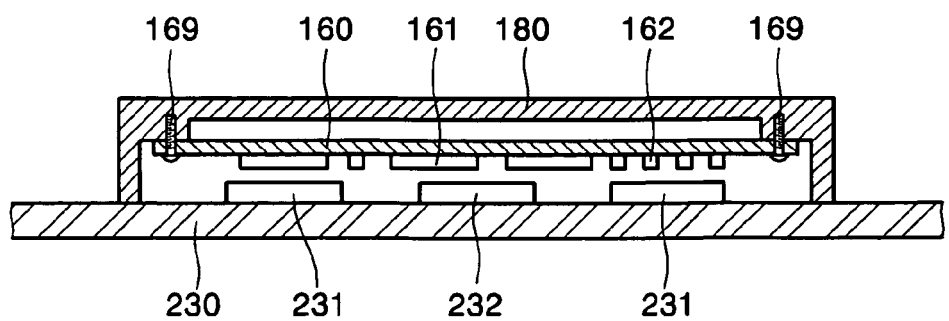
FIG. 13 is a sectional view of the mobile phone on which the HDD assembly is mounted, taken along line X2-X2 shown in FIG. 1.

FIG. 10 is a schematic perspective view of a mobile phone on which the HDD assembly shown in FIG. 5 is mounted. FIG. 11 is a perspective view of the mobile phone on which the HDD assembly, in FIG. 5, is mounted. FIG. 12 is a sectional view of the mobile phone employing the HDD assembly, taken along line X1-X1 shown in FIG. 11. FIG. 13 is a sectional view of the HDD assembly mounted on the mobile phone, taken along line X2-X2 shown in FIG. 11. While the HDD assembly consistent with the present invention can be applied to various kinds of portable electronic devices, a case where the HDD assembly is mounted on a mobile phone will be exemplarily explained below.

Referring to FIGS. 10 and 11, a mobile phone 200 includes a front cover 210, a main PCB 230 installed on a rear surface of the front cover 210 and operating the mobile phone 200, and a back cover 220 coupled to the front cover 210 and covering the main PCB 230. The main PCB 230 and the back cover 220 face each other, and a space is formed therebetween.

The HDD assembly 100 is mounted on the main PCB 230. To this end, the main PCB 230 includes a first area A on which the HDD 110 is mounted and a second area B over which the PCB 160 is disposed. Since the second damping pad 172 attached to the cover member 112 of the HDD 110 closely contacts the first area A, semiconductor chips or the like cannot be mounted on the first area A. As shown in FIG. 13, since the PCB 160 disposed over the second area B is spaced a predetermined distance from a surface of the main PCB 230, a predetermined space is formed between the semiconductor chips 161 and the circuit elements 162 mounted on the PCB 160 and the surface of the main PCB 230. Accordingly, mobile phone semiconductor chips 231 can be mounted on the second area B of the main PCB 230. Consequently, although the HDD assembly 100 is mounted on the main PCB 230 of the mobile phone 200, the main PCB 230 can secure sufficient areas for the semiconductor chips 231 and other circuit elements.

An insertion hole 225 into which the HDD assembly 100 is inserted is formed in the back cover 220 of the mobile phone 200 such that the HDD assembly 100 can be mounted on the main PCB 230. Accordingly, although the front cover 210, the back cover 220, and the main PCB 230 of the mobile phone 200 are assembled, the HDD assembly 100 can be easily mounted on the main PCB 230 through the insertion hole 225 from behind the back cover 220. Further, the HDD assembly 100 can be easily separated from the mobile phone 200 to be replaced with a new one without disassembling the mobile phone 200.

The HDD assembly 100 is fixed to the mobile phone 200 using a plurality of mounting screws 199 while being inserted into the insertion hole 225 formed in the back cover 220. To this end, a plurality of mounting bosses 212 are formed on a rear surface of the front cover 210 of the mobile phone 200, and mounting screw coupling holes 214, into which the mounting screws 199 are coupled, are formed in the mounting bosses 212. The mounting screw coupling holes 214 correspond in position to the plurality of screw insertion holes 186 formed at the four angular points of the mounting bracket 180 of the HDD assembly 100. Accordingly, if the mounting screws 199 are coupled into the screw insertion holes 186 of the mounting bracket 180 and then inserted into the mounting screw coupling holes 214 of the front cover 210, the HDD assembly 100 is tightly mounted on the mobile phone 200.

As described above, if the HDD assembly 100 is mounted on the mobile phone 200, the second damping pad 172 is disposed between the cover member 112 of the HDD 110 and the main PCB 230, thereby preventing external shocks applied to the mobile phone 200 from being transferred to the HDD 110 through the main PCB 230. As previously described, since the first damping pad 171 is disposed between the base member 111 of the HDD 110 and the mounting bracket 180, external shocks applied to the mobile phone 200 are prevented from being transferred to the HDD 110 through the mounting bracket 180 as well.

When the HDD assembly 100 is mounted on the mobile phone 200, if the FPC 168 provided on the PCB 160 is connected to an FPC connector 232 provided on the main PCB 230, the PCB 160 and the main PCB 230 are electrically connected to each other by the FPC 168.

According to the structure where the HDD assembly 100 is mounted on the mobile phone 200, a thickness increment of the mobile phone 200 can be minimized, which will be explained in detail with reference to FIG. 12.

Referring to FIG. 12, for example, when the 0.85-inch diameter HDD 110 is mounted on the mobile phone 200, the thickness of the HDD 110 is 3.3 mm, and the thickness of each of the first and second damping pads 171 and 172 is 0.5 mm.

Since the PCB 160 is disposed beside the HDD 110 and the first damping pad 171 contacts the surface of the base member 111, other than the motor support portion 116 and the pivot support portion 117 protruding from the base member 111, such that the PCB 160 and the first damping pad 171 do not increase the thickness of the mobile phone 200, the sum of the thickness of the second damping pad 172 and the thickness of the HDD 110 is approximately 3.8 mm.

In an exemplary embodiment, there is a distance of 0.2 mm or so between the cover plate 190, which covers the through-hole 185 formed in the mounting bracket 180, and the protrusions 116 and 117 of the base member 111, as previously mentioned. When the first damping pad 171 interposed between the mounting bracket 180 and the base member 111 has a shrinkage of approximately 30%, the first damping pad 171 shrinks about 0.15 mm if shocks are applied to the first damping pad 171. Accordingly, if there is the distance of approximately 0.2 mm between the cover plate 190 and the protrusions 116 and 117 of the base member 111, collision therebetween can be prevented sufficiently.

As a result, the distance between the main PCB 230 and the cover plate 190, that is, the sum of the thickness of the second damping pad 172, the thickness of the HDD 110, and the interval between the cover plate 190 and the protruding motor support portion 116 and pivot support portion 117, is approximately 4.0 mm. That is, the total thickness of the HDD assembly 100 excluding the cover plate 190 is approximately 4.0 mm. Consequently, the thickness of the mobile phone 200 on which the small HDD 110 is mounted according to the present invention is smaller than the counterpart according to the conventional art.

Figure 14:
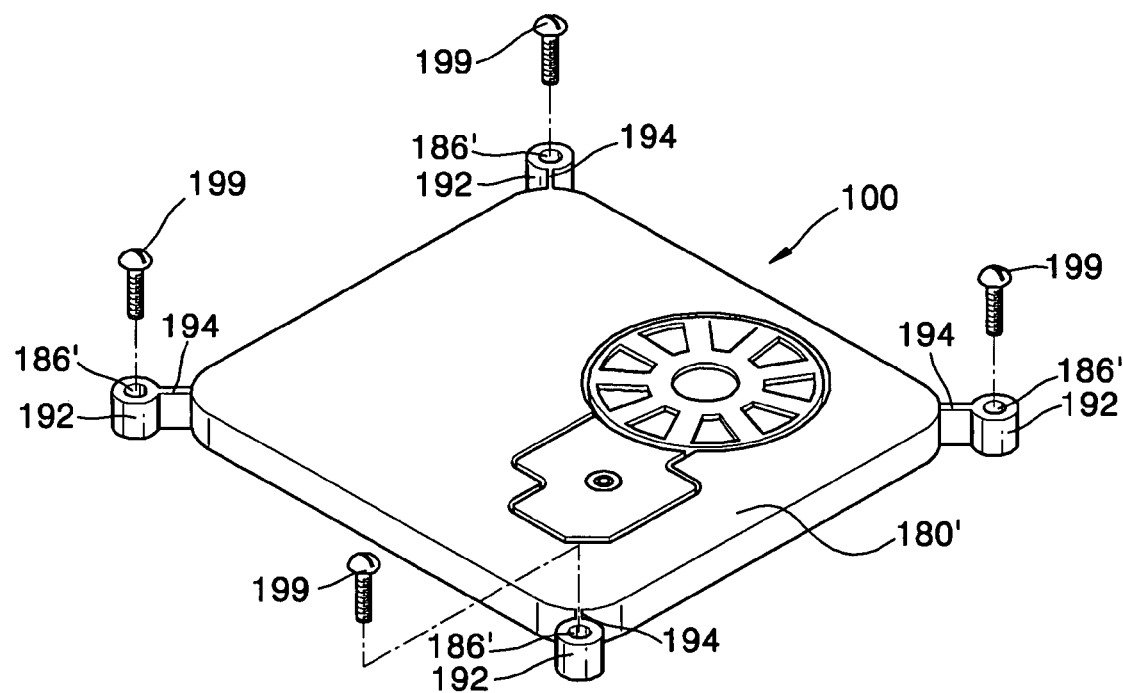
FIG. 14 is a perspective view illustrating a modified example of the mounting bracket of the HDD assembly shown in FIG. 5.

FIG. 14 is a perspective view illustrating a modified example of the mounting bracket of the HDD assembly shown in FIG. 5.

Referring to FIG. 14, mounting units 192 and connecting units 194 may be disposed at four angular points of a mounting bracket 180' of the HDD assembly 100. The mounting units 192 are spaced a predetermined distance from the four angular points of the mounting bracket 180', and screw insertion holes 186' into which the mounting screws 199 are respectively inserted are formed in the mounting units 192. The connecting units 194 have a thin plate shape and connect the four angular points of the mounting bracket 180' to the mounting units 192. The connecting units 194 function as springs when horizontal shocks or vibrations are applied to the HDD assembly 100 to reduce the shocks or vibrations.

Accordingly, the HDD assembly 100 having the mounting bracket 180' can obtain shock or vibration absorbing effects using the connecting units 194 as well as the first and second damping pads 171 and 172, thereby ensuring a more stable operation of the HDD 110.

As described above, keeping pace with the trend of lighter, thinner, and smaller portable electronic devices, the portable electronic device, such as, the mobile phone, employing the small HDD consistent with the present invention is thin.

Also, the HDD assembly can be more easily handled and mounted on the electronic device using the mounting bracket.

In addition, since the larger spindle motor can be employed in the HDD, merits of high rotational stiffness, low power consumption, and improved start-up at a low temperature can be obtained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A hard disk drive assembly comprising:
    a hard disk drive comprising:
        a base member,
        a cover member,
        a spindle motor installed on the base member,
        at least one data storage disk mounted on the spindle motor, and
        an actuator pivotably installed on the base member and moving a read/write head to a predetermined position on the disk;
    a printed circuit board disposed beside the hard disk drive and which operates the hard disk drive; and
    a mounting bracket mounted on an electronic device while accommodating the hard disk drive and the printed circuit board, wherein said mounting bracket comprises:
        a first accommodating space adapted to accommodate the hard disk drive;
        a second accommodating space disposed beside the first accommodating space and adapted to accommodate the printed circuit board;
        a through-hole formed in the first accommodating space, into which protrusions formed on the base member of the hard disk drive are inserted; and
        a cover plate attached to the mounting bracket to cover the through-hole formed in the first accommodating space.

2. A hard disk drive assembly comprising:
    a hard disk drive comprising
        a base member
        a cover member a spindle motor installed on the base member,
at least one data storage disk mounted on the spindle motor, and
an actuator pivotably installed on the base member and moving a read/write head to a predetermined position on the disk;
a printed circuit board disposed beside the hard disk dive and which operates the hard disk drive;
a mounting bracket mounted on an electronic device while accommodating the hard disk drive and the printed circuit board, wherein said mounting bracket comprise:
a first accommodating space adapted to accommodate the hard disk drive,
a second accommodating space disposed beside the first accommodating space and adapted to accommodate the printed circuit board,
a through-hole into which protrusions formed on the base member are inserted, and
a cover plate attached to the mounting bracket to cover the through-hole;
a first damping pad interposed between the base member of the hard disk drive and the mounting bracket; and
a second damping pad attached to an outer surface of the cover member of the hard disk drive.

3. The hard disk drive assembly of claim 2, wherein the first damping pad contacts a surface of the base member other than protrusions formed on the base member.

4. The hard disk drive assembly of claim 3, wherein the protrusions comprise:
a motor support portion, which supports the spindle motor of the hard disk drive; and
a pivot support portion, which supports an actuator pivot.

5. The hard disk drive assembly of claim 3, wherein a surface of the first damping pad contacting the surface of the base member conforms with a curved surface of the base member.

6. The hard disk drive assembly of claim 1, wherein the cover plate is a metal sheet.

7. The hard disk drive assembly of claim 1, wherein the cover plate is spaced a predetermined distance from the protrusions formed on the base member.

8. The hard disk drive assembly of claim 2, wherein the second damping pad has a substantially rectangular frame shape attached along edges of the cover member of the hard disk drive.

9. The hard disk drive assembly of claim 2, wherein the second damping pad has a substantially rectangular plate shape attached to the overall surface of the cover member of the hard disk drive.

10. The hard disk drive assembly of claim 2, wherein at least one of the first damping pad and the second damping pad are made of viscoelastic material.

11. The hard disk drive assembly of claim 1, wherein the printed circuit board is electrically connected to the hard disk drive by at least one flexible printed circuit.

12. The hard disk drive assembly of claim 1, wherein a partition is formed between the first accommodating space and the second accommodating space.

13. The hard disk drive assembly of claim 12, wherein the printed circuit board is electrically connected to the hard disk drive by at least one flexible printed circuit, and
wherein the partition comprises at least one groove through which the at least one flexible printed circuit passes.

14. The hard disk drive assembly of claim 1, wherein the printed circuit board is fixed in the second accommodating space of the mounting bracket using a plurality of screws.

15. The hard disk drive assembly of claim 1, wherein the printed circuit board supports electrically connecting means that electrically connects the printed circuit board to the electronic device.

16. The hard disk drive assembly of claim 15, wherein the electrically connecting means comprises a flexible printed circuit.

17. The hard disk drive assembly of claim 15, wherein the electrically connecting means comprises a mating socket.

18. The hard disk drive assembly of claim 17, wherein the printed circuit board is fixed in the second accommodating space of the mounting bracket using a plurality of screws, and
wherein dampers are installed between the printed circuit board and the mounting bracket.

19. The hard disk drive assembly of claim 18, wherein the dampers are installed between the printed circuit board and the mounting bracket while being fitted around the screws.

20. The hard disk drive assembly of claim 1, wherein a screw insert ion hole, into which a mounting screw for mounting the mounting bracket on the electronic device is inserted, is formed at each angular point of the mounting bracket.

21. The hard disk drive assembly of claim 1, further comprising:
a thin plate-shape connecting unit which extends a predetermined length from each angular point of the mounting bracket to function as a spring; and
a mounting unit comprising a screw insertion hole into which a mounting screw for mounting the mounting bracket on the electronic device is inserted is formed on an end portion of the connecting unit.

22. A hard disk drive assembly comprising:
a hard disk drive;
a printed circuit board disposed beside the hard disk drive and which operates the hard disk drive; and
a mounting bracket mounted on an electronic device while accommodating the hard disk drive and the printed circuit board, wherein said mounting bracket comprises:
a first accommodating space adapted to accommodate the hard disk drive;
a second accommodating space disposed beside the first accommodating space and adapted to accommodate the printed circuit board;
a through-hole formed in the first accommodating space, into which protrusions formed of the hard disk drive on the hard drive are inserted; and
a cover plate attached to the mounting bracket to cover the through-hole formed in the first accommodating space.

* * * * *